United States Patent

Swart

[11] 3,916,838
[45] Nov. 4, 1975

[54] DOOR PROTECTOR

[76] Inventor: Geraldine Ann Swart, 250 Ridge Ave., Evanston, Ill. 60202

[22] Filed: Feb. 26, 1974

[21] Appl. No.: 446,028

[52] U.S. Cl. .................................. 119/29; 49/460
[51] Int. Cl.² .......................................... A01K 15/00
[58] Field of Search .............. 49/70, 460; 150/52 R; 119/1, 29; 40/128, 331

[56] References Cited
UNITED STATES PATENTS

| | | | |
|---|---|---|---|
| 2,655,122 | 10/1953 | Adams | 119/29 X |
| 3,085,551 | 4/1963 | Helmer | 119/29 X |

*Primary Examiner*—Kenneth Downey

[57] ABSTRACT

This invention relates generally to the field of pet accessories, and specifically to the protection of doorfinishes in the homes of pet owners.

3 Claims, 8 Drawing Figures

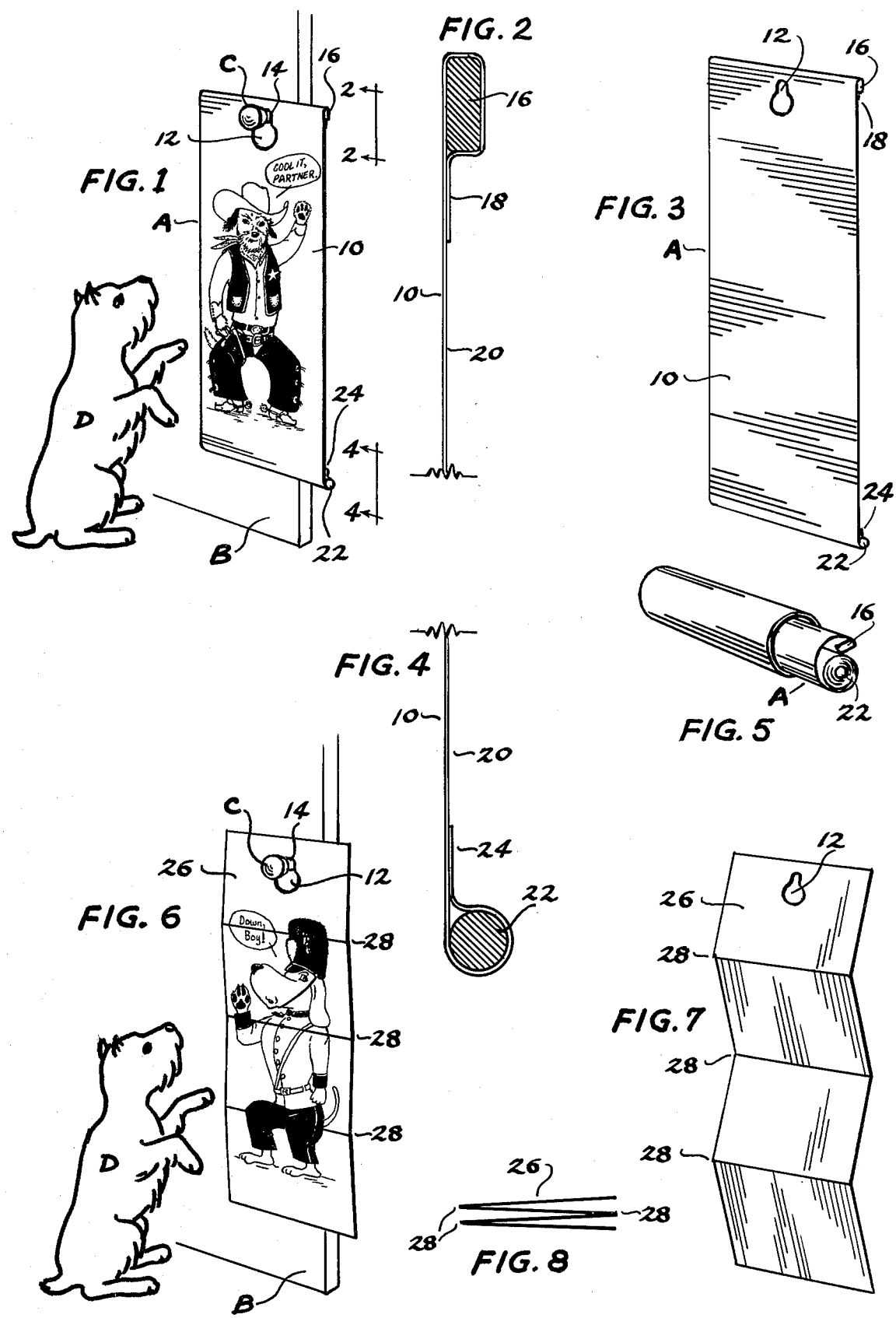

DOOR PROTECTOR

As is commonly known, a typical characteristic of dogs is their uncontrollable habit of leaping and clawing at doors when confined alone, or when demonstrating joy at the owner's arrival who is still on the opposite side of the door. Dogs, particularly, are prone to causing much damage, inflicting long scratches on door finishes, usually under the door knob area.

This invention differs from other door knob suspended devices, in that their objectives are to encourage an animal to scratch in that particular location for various reasons, whereas this invention has the opposite objective, which is to discourage an animal since no incentive is provided.

The object then of this invention is to make available to pet owners a protective device, an oblong panel which may be removably supported from a door knob in residence, thus protecting the door finish. Width of said panel is established to fit all doors, including those placed at right angles to a wall such as in hallways. The door protector panel does in no way restrict use of the door in opening and closing same. A dog repellent spray may also be applied to the panel as a further deterrent.

Another object of this invention is the fabrication of a door protector panel that can be produced in the simplest possible form, using materials best suited to the elimination of costly constructions, thereby assuring minimum purchase price to needy households, and potential widespread use by pet owners.

Yet another object of this invention, by means of its simplicity in design and construction, is its roll-up or fold-up features, reducing shipping size to a minimum and establishing this door protector as a desirable premium item useful in the promotion of pet foods or other pet accessory fields. It is also easily transportable to different locations.

Still another object of this invention is to provide a protective panel with a decorative appearance. Said panel to be printed in graphic designs, preferably lithographed, on a washable roll-up vinyl panel, or on a foldup cardboard protector, both containing a die-cut opening at the top for suspension from a door knob, hereinafter described in detail.

A final object of this invention is to produce a door protector at the lowest possible cost making it attainable for pet owners who may wish to purchase several panels for as many doors as need protection in a single household, and to offer a variety of designs when a change in decor is preferred.

With reference to the drawings;

FIG. 1 is a perspective view of the preferred form door protector panel shown suspended from a door knob, and removably affixed to the door.

FIG. 2 is an end view of the top stiffener encased in a sealed flange taken on line 2—2 of FIG. 1. (Partial elevation)

FIG. 3 is a perspective view of the flexible door protector panel as it appears unrolled and off the door.

FIG. 4 is an end elevational view of the bottom stiffener encased in a sealed flange taken on line 4—4 of FIG. 1.

FIG. 5 is a perspective view of the flexible panel rolled up and partially inserted in a mailing tube for compactness in shipping.

FIG. 6 is a perspective view of the first alternate form of the invention hung on a door knob and removably suspended.

FIG. 7 is a perspective view of the alternate form off the door and partially folded on score lines;

FIG. 8 is a side view of the alternate form as it appears almost completely folded for packing.

Referring now to FIG. 1 of the drawing for the preferred form A of the invention, which is a panel fabricated of a flexible material 10, it will be seen that it can be removably supported from a door B having a knob C projecting therefrom. When the invention A is supported as described it becomes a protective device which protects the door finish, as well as a deterrent to D animal scratching and clawing.

At the top center of panel A is a die-cut opening 12, designed to receive the door knob C and fix its position over the knob shaft 14. Said opening 12 is comprised of a ¾ circular shape at the bottom part and tapers upward to a short narrow slot ending in a half-round shape at the top which hugs the knob shaft 14, thereby maintaining a fixed position on the door B. The top of die-cut opening 12 is positioned directly at the bottom edge of stiffener 16, allowing stress of scratching animal to be absorbed by stiffener 16, and not by die-cut opening 12.

The detailed structure of the preferred form A is an end elevational view, enlarged, and taken on line 2—2 shown in FIG. 1. It includes an elongate stiffener 16, or slat, providing horizontal rigidity to the panel material 10 at the top. Said stiffener 16 being encased in a sealed flange 18 on the back of material 10, preferably heat sealed if material is vinyl. If material 10 is leatherette or other, a suitable fabricated enclosure to secure stiffener 16 will be used. Said stiffener 16 is thin enough to permit top area of panel A to shift forward when width of said panel A extends over slightly projecting door frames, as it hangs suspended, yet strong enough to absorb stress. In FIG. 2 the back surface of material 10 is indicated by number 20.

Referring to FIG. 4, this is the end elevational view of bottom stiffener 22 taken on line 4—4, of FIG. 1, and is a round dowl or other appropriate material, encased in a sealed flange 24 as flange 18 in FIG. 2. Said stiffener 22 provides rigidity to the bottom of panel A, and also has sufficient weight to hold panel A taut while it hangs suspended from door knob C. The back of material 10 is indicated by number 20 as in FIG. 2.

A first alternate form 26 of the invention is shown in FIG. 6, which differs from the preferred form thereof, in the choice of material and structure. The die-cut opening at the top is the same as in the preferred form A, and is identified by the same number 12. This alternate panel 26 is fabricated of a proper weight cardboard incorporating three scored lines (one reversed) and all identified by number 28. Said panel 26 folds down to a compact size as shown in end view FIG. 8, and may be individually or bulk packed for shipping. Said panel 26 is removably suspended from knob C as the preferred form A.

Although the objective of this invention is effectively achieved by the preferred and alternate forms hereinbefore mentioned, as well as the advantages provided, it is understood that I do not mean to be limited to the details of construction herein shown and described, other than as defined in the following claims.

What I claim is:

1. A flexible door protector panel adapted to be removably suspended from a door knob for protecting the door finish from damage caused from pets which leap and claw at doors comprising; an oblong panel provided with an opening at the top center thereof, said opening defining a lower circular portion large enough to accommodate a door knob and an upper slot portion rounded off at the upper end thereof, said flexible panel being collapsible for storage when not in use and extensible for door protection when suspended from a door knob, a graphic design printed on the face of said panel comprising stylized art work compatible with the animal deterrent concept such as a humorous constumed dog with a paw raised in a command signal and a line of copy such as "Down Boy" or "Cool it Pardner".

2. The door protector panel as set forth in claim 1 wherein said panel is a roll-up panel provided with elongated stiffeners disposed in sealed sleeves at the top and bottom margins of said panel thereby providing horizontal stiffeness to the flexible panel and providing weight for maintaining the panel vertically flat against a door while hanging suspended from a door knob, and a tube or sleeve adapted to received the rolled-up flexible panel for compactness and convenience of marketing.

3. The door protector panel as set forth in claim 1 wherein said flexible panel comprises a plurality of rigid sections separated by transverse score lines, said score lines being equally spaced and on alternate sides of said panel whereby said panel can be folded flat for storage and packaging.

* * * * *